United States Patent
Moreiras

[11] 3,888,522
[45] June 10, 1975

[54] FLARELESS FITTING

[75] Inventor: Luis Moreiras, Northfield, Ohio

[73] Assignee: The Weatherhead Company, Cleveland, Ohio

[22] Filed: Apr. 1, 1974

[21] Appl. No.: 456,864

[52] U.S. Cl. ............................ 285/341; 285/382.7
[51] Int. Cl. ........................................... F16l 17/00
[58] Field of Search ............... 285/341, 382.7, 342

[56] References Cited
UNITED STATES PATENTS

| | | | |
|---|---|---|---|
| 3,103,373 | 9/1963 | Lennon et al. | 285/382.7 X |
| 3,402,949 | 9/1968 | Mahoney | 285/382.7 X |
| 3,501,177 | 3/1970 | Jacobs | 285/382.7 X |

FOREIGN PATENTS OR APPLICATIONS

| | | | |
|---|---|---|---|
| 811,384 | 4/1959 | United Kingdom | 285/341 |

*Primary Examiner*—Andrew V. Kundrat
*Attorney, Agent, or Firm*—McNenny, Farrington, Pearne & Gordon

[57] ABSTRACT

A tube coupling is disclosed which includes a tube, a body, a nut, a rear sleeve, and a front sleeve. The nut may be threadably advanced on the body from a starting position to a midway position and from the midway position to a tightened position. During movement of the nut from the starting position to the midway position, the front sleeve retains the rear sleeve against axial movement, and the rear sleeve is contracted radially inwardly by a camming surface of the nut to grip the tube. Upon movement of the nut from the midway position to the tightened position, the nut carries the front sleeve axially forwardly so that a camming surface of the body contracts the front sleeve radially inwardly to form a seal to prevent leakage. The rear sleeve provides a cutting edge for preventing axial pull out of the tube, provides an axial shoulder which grips the tube to prevent radial movement of the tube relative to the nut, and provides a positive stop for preventing over tightening of the front sleeve.

13 Claims, 4 Drawing Figures

FLARELESS FITTING

BACKGROUND AND SUMMARY OF THE INVENTION

This invention relates generally to flareless tube fittings (which are fittings for tubes in which the end of the tube is not flared prior to assembly of the fitting), and more particularly to multiple sleeve flareless tube fittings.

Flareless fittings for tubes have long been used for providing dependable couplings for tubes. One such flareless fitting which uses a single sleeve is disclosed in U.S. Pat. No. 2,201,404. Another such flareless fitting which uses multiple sleeves is disclosed in U.S. Pat. No. 2,349,180, while still another type of fitting which is self-flaring is disclosed in U.S. Pat. No. 3,250,550.

The present invention provides a flareless fitting for a tube which differs in structure and mode of operation from these prior art flareless fittings and from other prior art fittings known to the applicant. The invention is characterized by a front sleeve and a rear sleeve in which the front sleeve retains the rear sleeve against axial movement relative to the tube until the rear sleeve has been contracted radially inwardly to grip the tube. The front sleeve is then moved axially away from the rear sleeve and is itself contracted radially inwardly to grip the tube and seal against leakage of fluid. The rear sleeve includes a cutting edge which is embedded radially inwardly into the tube to assist the cutting edge of the front sleeve in preventing axial pull out of the tube, an axially extending cylindrical shoulder which tightly grips the tube to prevent radial movement of the tube, and an abutment surface which prevents over tightening of the front sleeve.

More specifically, the fitting includes a tube, a body, a nut, a rear sleeve, and a front sleeve. The body and nut include threaded portions for axially advancing the nut relative to the body from a starting position to a midway position and from the midway position to a tightened position. The rear sleeve includes a radially inwardly extending cutting edge for cutting into the tube, and the front sleeve is disposed between the rear sleeve and the body for retaining the rear sleeve in a predetermined axial position with respect to the tube until the nut is advanced from its starting position to its midway position to radially inwardly contract the rear sleeve to cut into the tube.

At the midway position, the nut engages the front sleeve so that the nut pushes the front sleeve axially forwardly away from the rear sleeve when the nut is tightened from the midway position to the tightened position. A camming surface on the body contracts the front sleeve cutting edge radially inwardly during such forward movement of the front sleeve so that the front sleeve seals between the tube and the camming surface of the body to prevent fluid leakage. When the tightened position is reached, the nut engages an abutment surface on the rear sleeve to prevent further tightening and preclude excessive deformation of the front sleeve.

BRIEF DESCRIPTION OF THE DRAWINGS

These and other aspects and advantages of the present invention will be more readily apparent upon an understanding of the preferred embodiment of the invention shown in the accompanying drawings, wherein.

DETAILED DESCRIPTION OF THE DRAWINGS

Figure 1:
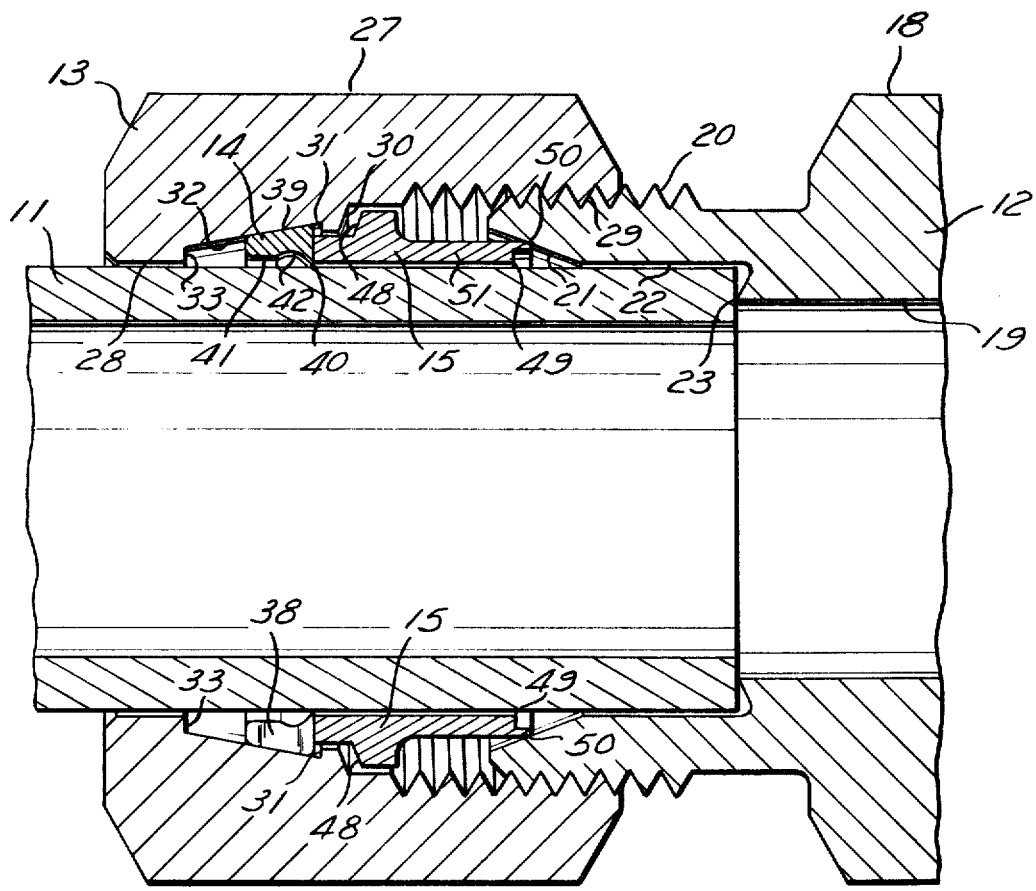
FIG. 1 is a cross-sectional side elevational view of a tube coupling according to the principles of the invention with the nut shown in its starting position relative to the body.

Referring now to the drawings in greater detail, FIG. 1 shows a flareless tube fitting which includes a tube 11, a body 12, a nut 13, a rear sleeve 14, and a front sleeve 15.

The tube 11 in the preferred embodiment is cylindrical and is a low carbon steel having a hardness of below 20 on the Rockwell C scale. The tube fitting will also work well with other tube materials including annealed stainless steel and cold drawn steel tubing, but the hardness of the tube must be less than the hardness of the cutting edges of the rear sleeve 14 and of the front sleeve 15 by a hardness difference of at least 15 points on the Rockwell C scale and preferably greater as further explained below. The tube fitting shown in FIG. 1 can also be used with a tube of aluminum or copper, but if the wall thickness of the aluminum or copper tube is not of great enough thickness to prevent radially inward deformation of the tube during tightening of the fitting, it will be necessary to insert a cylindrical mandrel into the interior of the tube to prevent such deformation of the tube during tightening. After tightening, the mandrel is removed to permit the flow of fluid through the tube.

The body 12 shown in FIG. 1 may be a straight line connector or a tee connector or it may be any other part to which it is desired to connect the tube 11. The body 12 is generally cylindrical and includes a hexagonal wrench receiving portion 18 for receiving a wrench during tightening of the fitting, a passage 19 for conveying fluid to or from the tube 11, and an externally threaded portion 20 for being threadably connected to the nut 13. The body 12 also includes a conical body camming surface 21 at its left or open end and an enlarged diameter tube receiving portion 22 disposed between the body camming surface 21 and the passage 19 for receiving the tube 11. An annular body cutting edge 23 is formed at the junction of the enlarged diameter portion 22 and the passage 19 to provide a stop from limiting axial movement of the tube 11 relative to the body 12 and for sealing against the end face of the tube 11.

The nut as shown in FIG. 1 is generally cylindrical and includes a hexagonal wrench receiving portion 27 and an axial passage 28 which extends from end to end through the nut 13. The right end of the passage 28 includes an enlarged diameter internally threaded portion 29 for threadably engaging the threaded portion 20 of the body 12. A first radially extending nut abutment surface 30 is located in the central region of the passage 28 for cooperating with the front sleeve 15 in a manner described in detail below. A radially extending shoulder 31 is also disposed in the passage 28, and a conical nut camming surface 32 extends from the shoulder 31 to a second radially extending nut abutment surface 33.

Figure 2:
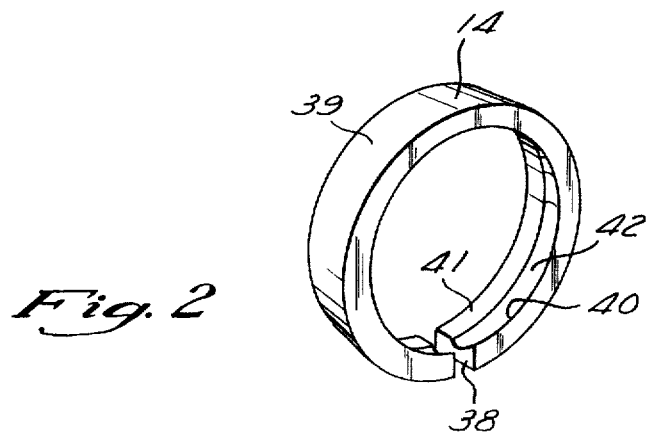
FIG. 2 is a perspective view showing the rear sleeve of the tube fitting shown in FIG. 1.

Referring now to FIGS. 1 and 2, the rear sleeve 14 is an annular sleeve which includes a slot 38 extending axially from end to end through the sleeve 14. The sleeve 14 includes an outer surface which provides an externally coned rear sleeve camming surface 39 which cooperates with the nut camming surface 32 in a manner described below. The rear sleeve 14 also includes an inner surface which provides a sharp radially inwardly extending annular cutting edge 40 for gripping the tube 11 and a generally cylindrical shoulder 41 extending solely in the axial direction for engaging a substantial axial extent of the outer surface of the tube 11 to prevent relative radial movement between the tube 11 and the rear sleeve 14 in a manner described below. The normal or free diameter of the cutting edge 40 is slightly greater than the diameter of the outer surface of the tube 11 so that the rear sleeve 14 can slide on the tube 11 prior to tightening of the fitting. In the preferred embodiment, the rear sleeve 14 is hardened throughout to a hardness of about 40 on the Rockwell C scale, so that the cutting edge 40 of the rear sleeve 14 is of greater hardness than the tube 11. Alternatively, the rear sleeve 14 may be case hardened to a hardness of about 50 on the Rockwell C scale to provide a cutting edge 40 of greater hardness than the tube 11. An annular relief 42 is disposed between the cutting edge 40 and the shoulder 41 to receive any metal of the tube 11 which is deformed radially outwardly by the cutting edge 40 in order to prevent such outwardly deformed material from preventing tight engagement of the shoulder 41 with the outer diameter of the tube 11.

The front sleeve 15 as shown in FIG. 1 includes a front sleeve abutment surface 48 for cooperating with the nut abutment surface 30 in a manner described below. The front sleeve 15 also includes an annular radially inwardly extending cutting edge 49 and a front sleeve pilot 50 which cooperates with the body camming surface 21 to radially inwardly deform the front sleeve cutting edge 49. The front sleeve 15 also includes an axially extending normally cylindrical portion 51 extending axially between the front sleeve abutment surface 48 and the front sleeve cutting edge 49. The front sleeve 15 is case hardened to a hardness of about 50 on the Rockwell C scale, so that the front sleeve 15 is also of greater hardness than the tube 11. The front sleeve 15 is not hardened throughout its thickness to prevent cracking of the front sleeve 15 when its cylindrical portion 51 is bowed radially outwardly as explained in detail below.

Prior to assembly of the various components shown in FIG. 1, the rear sleeve 14 is assembled on the nut 13. This is accomplished by pushing the rear sleeve 14 axially to the left as viewed in FIG. 1 past the nut abutment surface 30 so that the rear sleeve 14 contracts and the slotted portion 38 (FIG. 2) closes until the rear sleeve 14 passes the shoulder 31. The rear sleeve 14 then springs back to its normal or free diameter so that the nut 13 and rear sleeve 14 can slide on the tube 11.

To assemble the fitting shown in FIG. 1, the nut 13 with the rear sleeve 14 assembled thereon is first placed on the end of the tube 11. The front sleeve 15 is then assembled on the tube 11, and the nut 13 is manually loosely threaded onto the body 12 to the starting position shown in FIG. 1.

In this starting position, the axial distance between the first nut abutment surface 30 and the front sleeve abutment surface 48 is less than the axial distance between the second nut abutment surface 33 and the left end of the rear sleeve 14. The nut camming surface 32 engages the rear sleeve camming surface 39, and the tube 11 engages the edge 23 of the body 12. In this starting position, the front sleeve 15 extends between and engages the body camming surface 21 and the rear sleeve 14 to prevent axial movement of the rear sleeve 14 relative to the tube 11 during tightening of the nut 13 from the starting position shown in FIG. 1 to a midway position shown in FIG. 3. Because the rear sleeve 14 is restrained against axial movement by the front sleeve 15 during such tightening from the starting position shown in FIG. 1 to the midway position shown in FIG. 3, the nut camming surface 32 radially inwardly contracts the cutting edge 40 from its free diameter to a smaller diameter shown in FIG. 3 so that the cutting edge 40 is embedded in the tube 11 along its entire circumferential extent.

Figure 3:
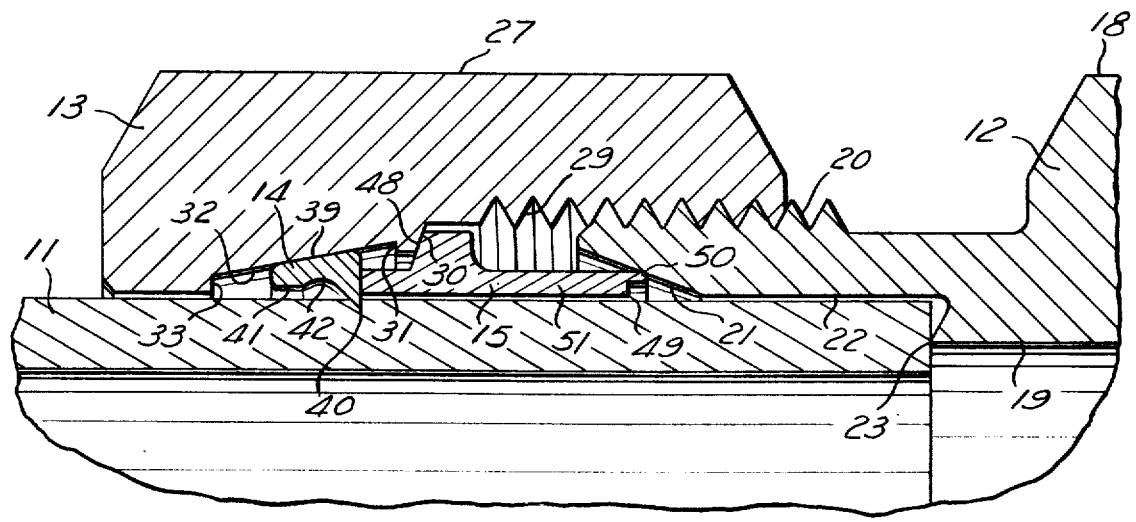
FIG. 3 is a cross-sectional side elevational view of the tube coupling shown in FIG. 1 but with the nut axially advanced to a midway portion.

When the midway position shown in FIG. 3 is reached, the first nut abutment surface 30 comes into contact with and loosely engages the front sleeve abutment surface 48. As the nut 13 is threadably tightened from the midway position shown in FIG. 3 to the fully tightened position shown in FIG. 4, the first nut abutment surface 30 axially advances the front sleeve 15 with the nut 13 relative to the body 12 and relative to the tube 11. During this movement of the nut 13 from the midway position shown in FIG. 3 to the fully tightened position shown in FIG. 4, the cutting edge 40 prevents axial movement of the rear sleeve 14 relative to the tube 11, and the nut camming surface 32 acts against the rear sleeve camming surface 39 to further radially inwardly contract the rear sleeve 14 and further embed the cutting edge 40 in the tube 11.

Figure 4:
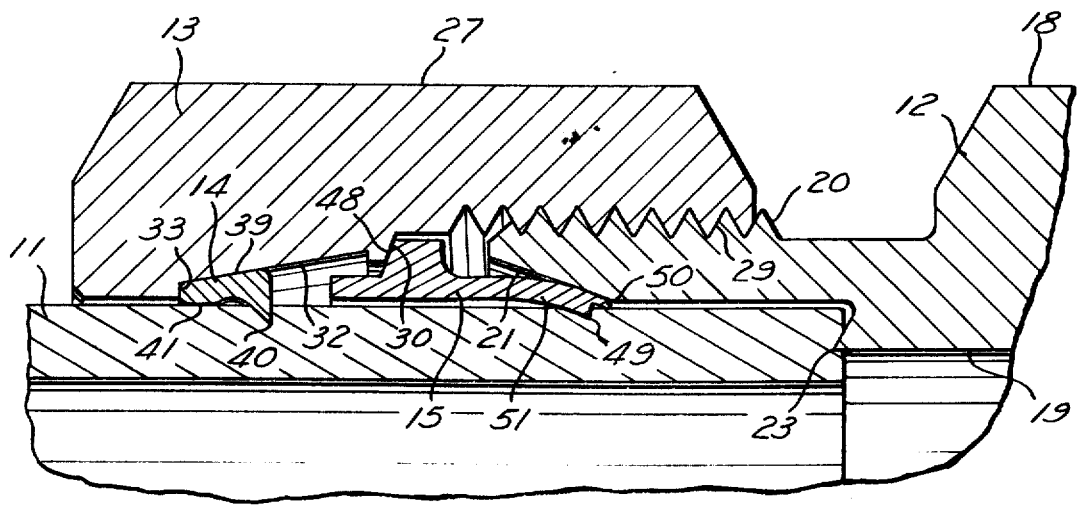
FIG. 4 is a cross-sectional side elevational view of the tube coupling shown in FIG. 1 but with the nut axially advanced to its tightened position.

During such axially advancing movement of the nut 13 from the midway position shown in FIG. 3 to the fully tightened position shown in FIG. 4, the body camming surface 21 radially inwardly contracts the front sleeve cutting edge 49 and pilot 50 to embed the cutting edge 49 in the tube 11 about its entire circumferential extent and to compress the front sleeve 15 between the camming surface 21 and the outer surface of the tube 11 to prevent fluid leakage therebetween. When the fully tightened position shown in FIG. 4 is reached, the normally cylindrical portion 51 is bowed radially outwardly in a manner shown in FIG. 4, and this bowing of the cylindrical portion 51 acts as a spring washer to keep the coupling tight.

It may be noted that the end face of the tube 11 is pushed slightly axially into the annular cutting edge 23 of the body 12 as the nut 13 is threadably tightened from the midway position shown in FIG. 3 to the tightened position shown in FIG. 4. This is a result of the forces transmitted by the nut 13 through the rear sleeve 14 and through the front sleeve 15 to the tube 11 tending to push the tube 11 axially forwardly relative to the body 12. Only a small amount of such axial movement of the tube 11 relative to the body 12 takes place during this tightening, and the cutting edge 23 contributes to the prevention of fluid leakage from the passage 19 and from the interior of the tube 11. However, the seal provided by the cutting edge 23 is not the primary seal of the fitting, but instead the leakage of fluid from the passage 19 and from the interior of the tube 11 is prevented primarily by the portion of the front sleeve 15 which is compressed between the body camming surface 21 and the tube 11.

When the tightened position shown in FIG. 4 is reached, the second nut abutment surface 33 axially engages the rear sleeve 14. Because the rear sleeve 14 cannot move relative to the tube 11 due to the cutting edge 40, this engagement prevents further axial tightening of the nut 13 relative to the tube 11 and relative to the body 12 so that the rear sleeve 14 provides a positive stop to prevent over tightening and resultant excessive deformation of the front sleeve 15. When the rear sleeve 14 is fully radially inwardly contracted in the tightened position shown in FIG. 4, the rear sleeve cutting edge 40 cooperates with the front sleeve cutting edge 49 to prevent axial pull out of the tube 11 from the fitting by an externally applied force on the tube 11 or by the fluid pressure in the passage 19 acting against the end face of the tube 11. When the tightened position shown in FIG. 4 is reached and the rear sleeve 14 is fully radially inwardly contracted, the shoulder 41 which extends solely in the axial direction tightly engages the outer surface of the tube 11 along a substantial axial extent to prevent relative radial movement of the tube 11 with respect to the rear sleeve 14 and the nut 13. In this manner, the rear sleeve 14 provides an axially extending shoulder 41 which tightly engages the outer surface of the tube 11 to prevent relative radial movement of the tube 11 with respect to the rear sleeve 14, the rear sleeve cutting edge 40 prevents axial pull out of the sleeve 11, and the rear sleeve 14 cooperates with the second nut abutment surface 33 to prevent over tightening of the front sleeve 15.

What is claimed is:

1. In combination, a tube, a body, a nut, a rear sleeve, and a front sleeve, said body including a threaded body portion and a conical body camming surface, said nut including a threaded nut portion for threadably engaging said threaded body portion to axially advance said nut relative to said body from a starting position to a midway position and from said midway position to a tightened position, a conical nut camming surface, and a nut abutment surface, said rear sleeve being annular and including a rear sleeve inner peripheral surface and a rear sleeve outer peripheral surface, said inner peripheral surface including a radially inwardly extending rear sleeve tube cutting edge for cutting into said tube, said front sleeve being annular and being disposed between said rear sleeve and said body camming surface and including a front sleeve abutment surface, said nut abutment surface being axially spaced from said front sleeve abutment surface and separating it from said nut camming surface and said nut camming surface engaging said rear sleeve and said front sleeve engaging said rear sleeve to prevent axial movement of said rear sleeve when said nut is in said starting position, said rear sleeve tube cutting edge being radially inwardly embedded in said tube by operation of said nut camming surface and said nut abutment surface lightly engaging said front sleeve abutment surface and said front sleeve engaging said rear sleeve when said nut is in said midway position, and said front sleeve being radially inwardly contracted by operation of said body camming surface and said nut abutment surface tightly engaging said front sleeve abutment surface and said front sleeve being axially spaced from said rear sleeve by operation of said nut abutment surface when said nut is in said tightened position.

2. The combination defined in claim 1 wherein said front sleeve retains said rear sleeve at a predetermined relative axial position on said tube when said nut is axially advanced from said starting position to said midway position, and said rear sleeve tube cutting edge retains said rear sleeve at said predetermined relative axial position on said tube when said nut is axially advanced from said midway position to said tightened position.

3. The combination defined in claim 2 wherein said nut includes another nut abutment surface, and said other nut abutment surface engages said rear sleeve when said nut is in said tightened position to prevent further tightening of said nut beyond said tightened position to prevent excessive deformation of said front sleeve.

4. The combination defined in claim 2 wherein said rear sleeve inner peripheral surface includes a cylindrical shoulder extending solely in the axial direction and disposed radially outwardly from said rear sleeve tube cutting edge, and said cylindrical shoulder tightly engages said tube when said nut is in said tightened position to prevent radial movement of said tube relative to said rear sleeve.

5. In combination, a tube, a body, a nut, a rear sleeve, and a front sleeve, said body including a threaded body portion and a conical body camming surface, said nut including a threaded nut portion for threadably engaging said threaded body portion to axially advance said nut relative to said body from a starting position to a midway position and from said midway position to a tightened position, a conical nut camming surface, and a nut abutment surface, said rear sleeve being annular and including a rear sleeve inner peripheral surface and a rear sleeve outer peripheral surface, said inner peripheral surface including a radially inwardly extending rear sleeve tube cutting edge for cutting into said tube, said front sleeve being annular and being disposed between said rear sleeve and said body camming surface, said front sleeve including a front sleeve abutment surface and a radially inwardly extending front sleeve tube cutting edge for cutting into said tube, said nut abutment surface being axially spaced from said front sleeve abutment surface and separating it from said nut camming surface and said nut camming surface engaging said rear sleeve and said front sleeve engaging said rear sleeve to prevent axial movement of said rear sleeve when said nut is in said starting position, said nut camming surface being constructed and arranged to radially inwardly embed said rear sleeve tube cutting edge in said tube when said nut is axially advanced from said starting position to said midway position, said rear sleeve tube cutting edge being radially inwardly embedded in said tube and said nut abutment surface lightly engaging said front sleeve abutment surface and said front sleeve engaging said rear sleeve when said nut is in said midway position, said nut abutment surface being constructed and arranged to push said front sleeve axially away from said rear sleeve and said body camming surface being constructed and arranged to radially inwardly embed said front sleeve tube cutting edge in said tube when said nut is axially advanced from said midway position to said tightened position, and said front sleeve tube cutting edge being radially inwardly embedded in said tube and said nut abutment surface tightly engaging said front sleeve abutment surface and said front sleeve being axially spaced from said rear sleeve when said nut is in said tightened position.

6. The combination defined in claim 5 wherein said nut includes another nut abutment surface, and said other nut abutment surface engages said rear sleeve when said nut is in said tightened position to prevent further tightening of said nut beyond said tightened position to prevent excessive deformation of said front sleeve.

7. The combination defined in claim 5 wherein said rear sleeve inner peripheral surface includes a cylindrical shoulder extending solely in the axial direction and disposed radially outwardly from said rear sleeve tube cutting edge, and said cylindrical shoulder tightly engages said tube when said nut is in said tightened position to prevent radial movement of said tube relative to said rear sleeve.

8. The combination defined in claim 5 wherein said rear sleeve outer peripheral surface includes a conical rear sleeve camming surface, and said nut camming surface engages said rear sleeve camming surface when said nut is axially advanced from said starting position to said midway position and from said midway position to said tightened position to radially inwardly embed said rear sleeve cutting edge in said tube.

9. The combination defined in claim 5 wherein said front sleeve abutment surface is axially spaced from said front sleeve tube cutting edge, said front sleeve includes an axially extending normally cylindrical portion extending between said front sleeve abutment surface and said front sleeve tube cutting edge, and said normally cylindrical portion is axially compressed and bowed radially outwardly when said nut is in said tightened position.

10. The combination defined in claim 5 wherein said front sleeve retains said rear sleeve at a predetermined relative axial position on said tube when said nut is axially advanced from said starting position to said midway position, and said rear sleeve tube cutting edge retains said rear sleeve at said predetermined relative axial position on said tube when said nut is axially advanced from said midway position to said tightened position.

11. The combination defined in claim 5 wherein said nut includes an annular retaining shoulder, said rear sleeve is split longitudinally along its entire length, and said retaining shoulder retains said rear sleeve on said nut prior to assembly of said nut on said tube.

12. In combination, a tube, a body, a nut, a rear sleeve, and a front sleeve, said body including a conical body camming surface, means to axially advance said nut relative to said body from a starting position to a midway position and from said midway position to a tightened position, said nut including a conical nut camming surface and a nut abutment surface, said rear sleeve being annular and including a rear sleeve inner peripheral surface and a rear sleeve outer peripheral surface, said inner peripheral surface including a radially inwardly extending rear sleeve tube cutting edge for cutting into said tube, said front sleeve being annular and being disposed between said rear sleeve and said body camming surface and including a front sleeve abutment surface, said nut abutment surface being axially spaced from said front sleeve abutment surface and separating it from said nut camming surface and said nut camming surface engaging said rear sleeve and said front sleeve engaging said rear sleeve to prevent axial movement of said rear sleeve when said nut is in said starting position, said rear sleeve tube cutting edge being radially inwardly embedded in said tube and said nut abutment surface lightly engaging said front sleeve abutment surface and said front sleeve engaging said rear sleeve when said nut is in said midway position, and said front sleeve being radially inwardly contracted and said nut abutment surface tightly engaging said front sleeve abutment surface and said front sleeve being axially spaced from said rear sleeve when said nut is in said tightened position.

13. The combination defined in claim 12 wherein said nut includes another nut abutment surface, the axial distance between said other nut abutment surface and said rear sleeve is greater than the axial distance between said first mentioned nut abutment surface and said front sleeve abutment surface when said nut is in said starting position, and said other nut abutment surface engages said rear sleeve when said nut is in said tightened position to prevent further advancing of said nut beyond said tightened position.

* * * * *